US010582592B2

(12) United States Patent
Magielse et al.

(10) Patent No.: US 10,582,592 B2
(45) Date of Patent: Mar. 3, 2020

(54) SENSOR LIGHT SETTING BLENDING

(71) Applicant: SIGNIFY HOLDING B.V., Eindhoven (NL)

(72) Inventors: Remco Magielse, Tilburg (NL); Antonie Leonardus Johannes Kamp, San Francisco, CA (US); Leendert Teunis Rozendaal, Valkenswaard (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/322,675

(22) PCT Filed: Jul. 24, 2017

(86) PCT No.: PCT/EP2017/068624
§ 371 (c)(1),
(2) Date: Feb. 1, 2019

(87) PCT Pub. No.: WO2018/024525
PCT Pub. Date: Feb. 8, 2018

(65) Prior Publication Data
US 2019/0182931 A1 Jun. 13, 2019

(30) Foreign Application Priority Data

Aug. 2, 2016 (EP) .................................. 16182414
Aug. 29, 2016 (EP) .................................. 16186065

(51) Int. Cl.
H05B 37/02 (2006.01)
(52) U.S. Cl.
CPC .............. H05B 37/0227 (2013.01)

(58) Field of Classification Search
None
See application file for complete search history.

(56) References Cited

U.S. PATENT DOCUMENTS

| 6,798,341 | B1 | 9/2004 | Eckel et al. |
| 2009/0310348 | A1 | 12/2009 | Laski et al. |
| 2010/0277106 | A1 | 11/2010 | Baaijens |
| 2010/0289412 | A1 | 11/2010 | Middleton-White et al. |
| 2011/0156610 | A1 | 6/2011 | Ostrovsky et al. |

(Continued)

FOREIGN PATENT DOCUMENTS

WO   WO2009090596 A1   7/2009

Primary Examiner — Jany Richardson
(74) Attorney, Agent, or Firm — Meenakshy Chakravorty

(57) ABSTRACT

A lighting system controller, a lighting system control method and software program product are provided for controlling a lighting device based on a trigger signal, such as a presence detection signal from a presence sensor. Instead of switching the lighting device to a fixed light setting at all times when the trigger signal is received, the initial light output of the lighting device is determined. The lighting device is then controlled according to a fixed light setting (e.g. white light at full brightness) if the determined initial light output is within a predetermined range, and else it is controlled according to a function relative to the determined initial light output. For example, if the lighting device is participating in a romantic scene emitting predominantly red light the lighting device may switch to reddish white light instead of the full white light and/or the brightness level of the light is lowered compared to the fixed light setting.

9 Claims, 3 Drawing Sheets

(56) References Cited

U.S. PATENT DOCUMENTS

| | | | |
|---|---|---|---|
| 2012/0025717 A1* | 2/2012 | Klusmann | H05B 37/0218 |
| | | | 315/152 |
| 2015/0054427 A1 | 2/2015 | Hatley et al. | |
| 2016/0050736 A1 | 2/2016 | Hoang | |
| 2016/0066393 A1 | 3/2016 | Bosua | |
| 2016/0174323 A1 | 6/2016 | Lunn et al. | |
| 2017/0238392 A1* | 8/2017 | Shearer | H05B 33/0854 |
| | | | 315/153 |

* cited by examiner

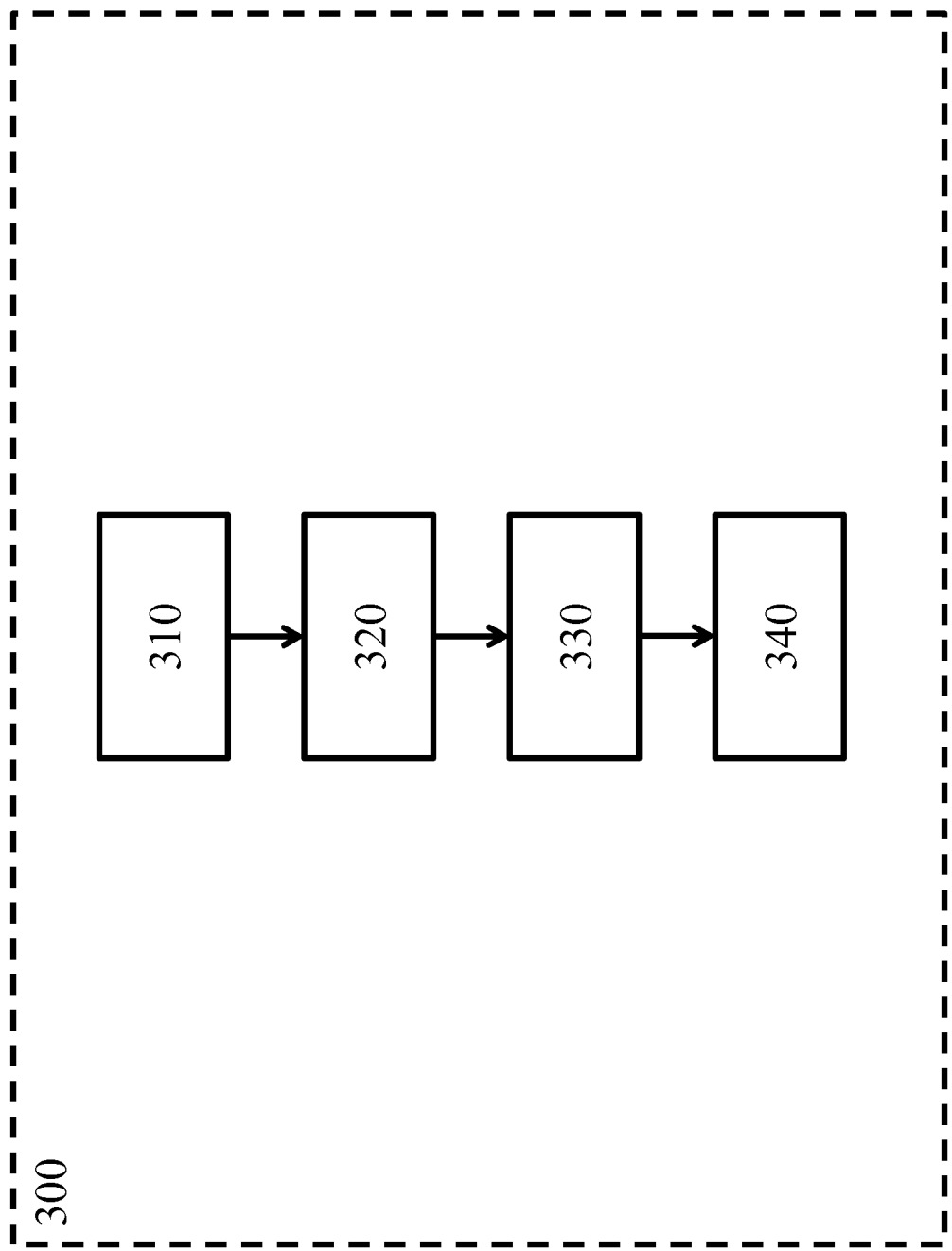

SENSOR LIGHT SETTING BLENDING

CROSS-REFERENCE TO PRIOR APPLICATIONS

This application is the U.S. National Phase application under 35 U.S.C. § 371 of International Application No. PCT/EP2017/068624, filed on Jul. 24, 2017, which claims the benefit of European Patent Application No. 16182414.9, filed on Aug. 2, 2016 and European Patent Application No. 16186065.5, filed on Aug. 29, 2016. These applications are hereby incorporated by reference herein.

FIELD OF THE INVENTION

The invention generally relates to a lighting system controller for controlling a lighting system based on a trigger signal, and in particular to such a lighting system controller for receiving a trigger signal from a sensor and for adapting the light output of a lighting device in the lighting system based on the trigger signal. The invention further relates to a method for controlling a lighting system and to a computer program product for performing the method.

BACKGROUND OF THE INVENTION

Advanced lighting systems have been in use in professional environments, such as office buildings, for many years. They offer advanced control features based on, amongst others, sensors and rules. As an example, lighting devices in a lighting system can be configured to turn on when a presence sensor detects a person's presence, such as in a meeting room. As a further example, lighting devices can be configured to turn on at a specific time, such as when people arrive in the office in the morning.

With the advance of so called 'smart homes' and 'internet of things', the automation of lighting systems targeted at consumers, such as for home use, is progressing. The use of a lighting system in the home and the effect on users of automated control of lighting is very different from the above mentioned office use. As such there is a need for lighting system automation better equipped for, for example, home use.

SUMMARY OF THE INVENTION

It is an object to provide a lighting system controller, a method and a computer program product providing lighting system automation better equipped for e.g. home use.

The inventors have realized that while professional lighting systems offer advanced control features for automatically changing the light output of a lighting device, this is nearly always directed at providing functional lighting. A presence sensor is typically used to switch between an energy saving mode, such as the lighting device being off, to a mode in which white light is provided allowing someone to work, navigate or perform any other task. Yet, at home that same person having experienced such advanced office lighting has very different lighting needs. Recently networked lighting systems for home use have emerged that allow a person to set any one of a number of colors, thereby creating scenes that are relaxing or invigorating, scenes that resemble an image or recreate an experience. When applying the logic programmed in a professional system to such a home system, the lighting experience of the user can be profoundly impacted. As an example, if the user has programmed a presence sensor to turn on a lighting device and emit bright white light then the triggering of this light setting will ruin a romantic light scene that has been set.

It is desirable to implement trigger signal based light output control, such as presence detection based control, of a lighting device in a manner in which the light output that the lighting device is switched to is dependent upon whether or not this lighting device and/or one or more other lighting devices in the lighting system are set to a scene when the trigger signal is received. In other words, it is desirable to take into account the initial light output of one or more lighting device when controlling at least one of the one or more lighting devices based on such a trigger signal.

In a first aspect, a lighting system controller is provided. The lighting system controller is arranged for controlling a lighting system. The lighting system comprises a lighting device for illuminating a space and can optionally comprise a (presence) sensor. The lighting system controller comprises a first interface, a second interface and a processor. The first interface is arranged for receiving a trigger signal. The trigger signal causes a change in the light output of the lighting device. The first interface can be an Ethernet or WiFi connection or any other wired or wireless connection, such that the controller offers an Application Programming Interface (API) which can be called by a device creating the trigger signal. For example, a sensor connected to the Internet or a Local Area Network can call an API of the lighting system controller, thereby providing the trigger signal. As another example, the lighting system controller, or another device, can poll one or more devices to determine whether a trigger has occurred and the confirmation that such a trigger has occurred is the trigger signal. The first interface can instead be any wireless or wired connection. The lighting system controller can for example be embedded in a sensor and thus receive the trigger signal via an internal connection, such as over a common bus.

The second interface can be the same interface as the first interface or a different interface. The second interface is arranged for controlling the lighting device. As an example, the second interface can be a ZigBee interface or any other wired or wireless interface. As an example, the first and second interface can comprise a single ZigBee network interface such that a device, e.g. a presence sensor, provides as a trigger signal a ZigBee message and the controller controls the lighting device by sending a further ZigBee message to the lighting device.

The lighting device is controlled according to control data generated by the processor. There can be multiple lighting devices in the lighting system. The trigger signal can be associated with one or more lighting devices and the controller can be configured to control multiple lighting devices, not all necessarily based on the trigger signal. As an example, one or more lighting devices in the lighting system are controlled based on the trigger signal and one or more other lighting device are controlled based on another signal, such as an input received from a wall switch. When the lighting system comprises multiple lighting devices, which one or more of these lighting devices are controlled based on the trigger signal can be dependent upon, for example, the time of day, the type of trigger signal received, the number of trigger signals received, the frequency at which trigger signals are received or any combination of these.

The processor is arranged for determining an initial light output of the lighting device. Color coordinates, an indication of a color space, a dim level, and/or other data can be part of the determined initial light output. The controller can determine the initial light output of the lighting device that is to be controlled based on the trigger signal received, yet in an embodiment alternatively or additionally the initial light output of at least one further lighting device which is not to be controlled based on the trigger signal is determined. For example, if there are multiple lighting devices and one of these is controlled based on the trigger signal, then the light output of the lighting devices not controlled based on the trigger signal can determine the generation of the control data. For example, if a first lighting device is turned off and it is to be turned on based on a trigger signal, the light output of a second and optionally other lighting devices can be used to determine what light output the first lighting device should switch too. If, continuing the example, the first lighting device is to switch to white light at maximum brightness when a presence sensor triggers, this white light output can be realized if all lighting devices are in an off state, whereas if the second and optionally other lighting devices are set to a romantic scene and the first lighting device is in an off mode, the first lighting device should be controlled to emit light better fitting this romantic scene. For example, the first lighting device can be controller to emit light in a red tone at maximum brightness, white light at a lower brightness, etc.

The initial light output can, as an example, be known to the controller at all times, such as when the controller caches the state of the one or more lighting devices it controls. Else, the data can be retrieved from another device, such as the lighting device.

The processor is further arranged for generating control data. The control data can be a command, such as a ZigBee command if the lighting system controller is to control the lighting device over such a network. Instead, the control data can be data that is yet to be converted to a command or signal for controlling the lighting device(s).

If the determined initial light output is within a predetermined range, this control data is based on a fixed light setting. The fixed light setting being different from the initial light setting. This fixed light setting should be interpreted as a target light setting, as the light output may not match the fixed light setting. As an example only, the fixed light setting might relate to a specific color and intensity of light which one or more lighting devices cannot support (e.g. their light output is limited in terms of intensity or they cannot provide a full color range). A predetermined range of light outputs can comprise a set of one or more scenes (e.g. functional scene, reading scene; or negatively defined as not a romantic scene), a range of values for one or more characteristics of the light output (e.g. the light being of a certain color and/or having a certain intensity and/or having a certain saturation level) or a state of the lighting device (e.g. off state) which cause the control data to be based on a fixed light setting. The predetermined range can be determined based on the initial light output, the fixed light setting or a combination thereof. As an example, this can cause the lighting system controller to control the light output according to the fixed light setting if said fixed light setting and the initial light setting are visually close (e.g. similar brightness levels and/or similar colors). Thus, continuing the examples provided, the lighting device can be controlled according to a fixed light setting when the lighting device is any one of: set to a reading scene, not set to a romantic scene, emits white or yellow light and/or emits light above 70% brightness or when the lighting device is turned off.

If the initial light output falls outside the predetermined range, the control data is generated according to a function relative to the determined initial light output. Thus, a function requiring as input the determined initial light output (e.g. the color of the light emitted and/or the brightness level of the light emitted) and providing as output a light setting. As a first example, the function can consider the brightness level of the determined initial light output and double this or average this with the fixed light setting. As a second example, the function can consider the color of the determined initial light output and shift the color towards a predetermined color such as the color of the fixed light setting. These examples are non limiting, the function determines a light setting according to which to control the light wherein the light setting is relative to the determined initial light output. The determined initial light output can relate to the light output of the lighting device or lighting devices that are to be controlled based on the trigger signal, yet it can alternatively or additionally relate to the light output of another lighting device in the lighting system, if present. The another lighting device in the system can, but need not be, controlled by the lighting system controller.

In an embodiment of the lighting system controller according to the first aspect, the lighting system controller is further arranged for, after a delay, reverting the light output of the lighting device to the determined initial light output. The determined initial light output can comprise, as an example, a color value and brightness level or a scene. This is beneficial as the lighting system automatically can restore the scene, e.g. when a period, such as five minutes, after receiving the last trigger signal has expired. When the trigger signal is indicative of presence detection, the lighting system can thus revert to its original setting when presence is no longer detected.

In a further embodiment of the lighting system controller according to the first aspect, the predetermined range comprises the lighting device emitting light below a predetermined intensity level (e.g. below 20% or 100 lux) and/or light within a predetermined color range (e.g. any color within a predetermined distance from the black body line or any color within a set of coordinates in a color space). As further examples, the predetermined range can comprise an area in a x,y color space, a CCT, the state of the lighting device (e.g. on/off), whether the initial light output is static or dynamic, etc.

In yet a further embodiment of the lighting system controller according to the first aspect, the trigger signal is received from a presence sensor and the trigger signal is indicative of the presence of a person being detected by the presence sensor. Instead of a presence sensor, the trigger signal can be based on a timer and a rule (e.g. switch to a scene at a set time), an internal event (e.g. the lighting system going into an emergency or power saving mode) or an external event (e.g. the lighting system being controlled by a computer program, a web service such as If This Then That, a user pressing a wall switch or an ambient light level sensor reading a change in light level and causing a rule to start a daylight harvesting program or to start a dusk light scene triggered by reduction in ambient light level).

In another embodiment of the lighting system controller according to the first aspect, the function according to which control data is generated comprises: increasing the brightness of the light output of the lighting device compared to the determined initial light output; and/or lowering the saturation of the light output of the lighting device compared to the determined initial light output. This is advantageous as it allows easy programming of the function. For example, the function can be user defined or the function can be based on the fixed light setting. The fixed light setting itself can be user defined. The lighting system controller can thus be implemented in a manner in which the user sets the fixed light setting through a user interface and the function according to which the light setting is determined when the initial light output is outside the predetermined range is automatically populated. Optionally the user can then fine tune the function, e.g. again via the user interface. Again, as further examples the function according to which control data is generated can comprise a function related to a movement in a x,y color space, a change in CCT, a change in the state of the lighting device (e.g. on/off), a change in the dynamism of an effect when the initial light effect is a dynamic effect (e.g. slowing down the speed of change, lowering the range of the dynamic effect, etc.), etc.

In a second aspect, a lighting system control method is provided. The method is for controlling a lighting device for illuminating a space. The method resembles the lighting system controller and its various embodiments according to the first aspect. Summarily, the method comprises: receiving a trigger signal for changing a light output of the lighting device, determining an initial light output of the lighting device, generating control data based on a fixed light setting if the determined initial light output is within a predetermined range, and else generating control data according to a function relative to the determined initial light output, and controlling the lighting device according to the generated control data.

In various embodiments of the method according to the second aspect, the method further comprises: controlling, after a delay, the lighting device to revert its light output to the determined initial light output. The predetermined range can comprise the lighting device emitting light below a predetermined intensity level and/or light within a predetermined color range. The trigger signal can be received from a presence sensor and the trigger signal can be indicative of the presence of a person being detected by the presence sensor. The function according to which control data is generated may comprise: increasing the brightness of the light output of the lighting device compared to the determined initial light output; and/or lowering the saturation of the light output of the lighting device compared to the determined initial light output. The fixed light setting can be user defined and/or the function can be user defined or based on the fixed light setting.

In a third aspect, a computer program product is provided for performing the method according to the second aspect when run on a computer device.

BRIEF DESCRIPTION OF THE DRAWINGS

These and other aspects of the invention will be apparent from and elucidated further with reference to the embodiments described by way of example in the following description and with reference to the accompanying drawings, in which:

FIG. 3 shows schematically and exemplarily a lighting system control method.

DETAILED DESCRIPTION OF EMBODIMENTS

Figure 1:
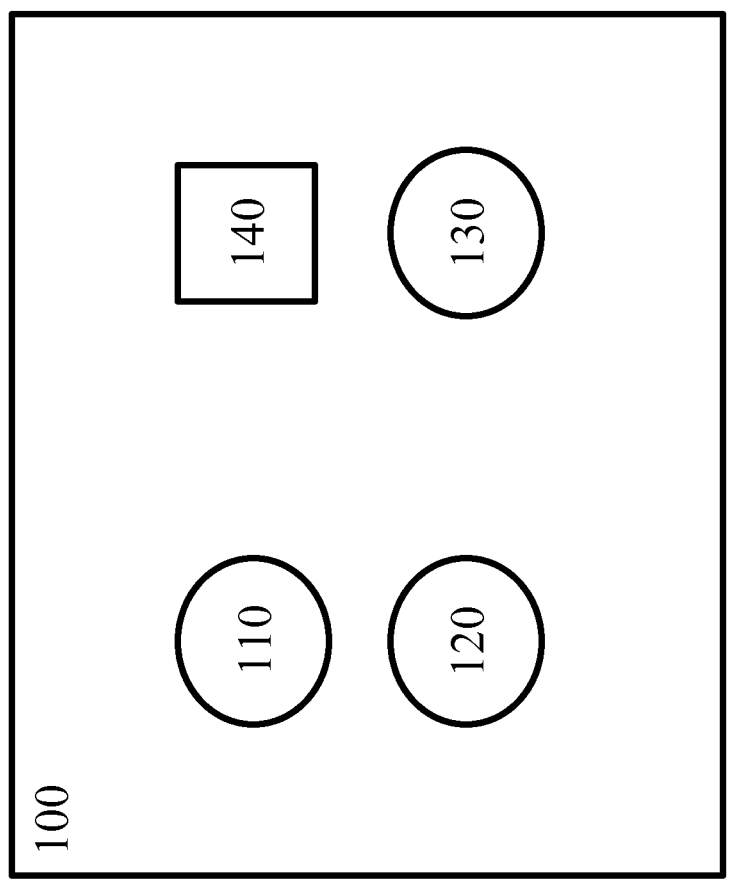
FIG. 1 shows schematically and exemplarily a room comprising a sensor and multiple lighting devices.

In FIG. 1 a room 100 is shown, the room 100 comprising a first lighting device 110, a second lighting device 120 and a third lighting device 130. The room 100 further comprises a sensor 140. Various scenarios for changing the light output of the lighting system are described below.

In a first scenario, all lighting devices 110, 120, 130 are OFF and a person enters the room 100 causing the sensor 140 to detect presence. The event of the sensor 140 triggering is associated with the first and second lighting device 110, 120 emitting white light at 80% brightness. As the lighting devices were not emitting light, they will be controlled to emit white light at 80% brightness.

In a second scenario, as a variation to the first scenario, the second and third lighting device 120, 130 are emitting red light at 40% brightness as part of, for example, a romantic scene having been set by a user in this room 100 (e.g. the user may have selected this scene using an app, a wall switch or using voice control). Lighting device 110 is OFF. Again, the event of the sensor 140 triggering is associated with the first and second lighting device 110, 120 emitting white light at 80% brightness. However, as the second lighting device 120 is not turned OFF when the sensor 140 is triggered, it remains emitting red light yet increases its output to 80% brightness. The first lighting device 110 can either output white light at 80% brightness or copy the output of the second lighting device. The third lighting device 130 does not change its light output. As such, the romantic scene is better preserved and at the same time the triggering of the sensor leads to an increased visibility in the room around the lighting devices 110, 120 associated with the trigger event.

As an example, the sensor is a presence sensor and the sensor has been configured by a user to be associated with the first and second lighting devices 110, 120 and white light at 80% brightness setting. The user has additionally set a rule for taking over the brightness level only when a lighting device is already outputting light when the sensor is triggered, or such a rule is applied by default. Although in this example the brightness level of the scene the presence sensor is associated with is carried over to those lighting devices that are ON when the presence sensor is triggered, a similar example could be made wherein instead or additionally the saturation level is taken over.

Figure 2:
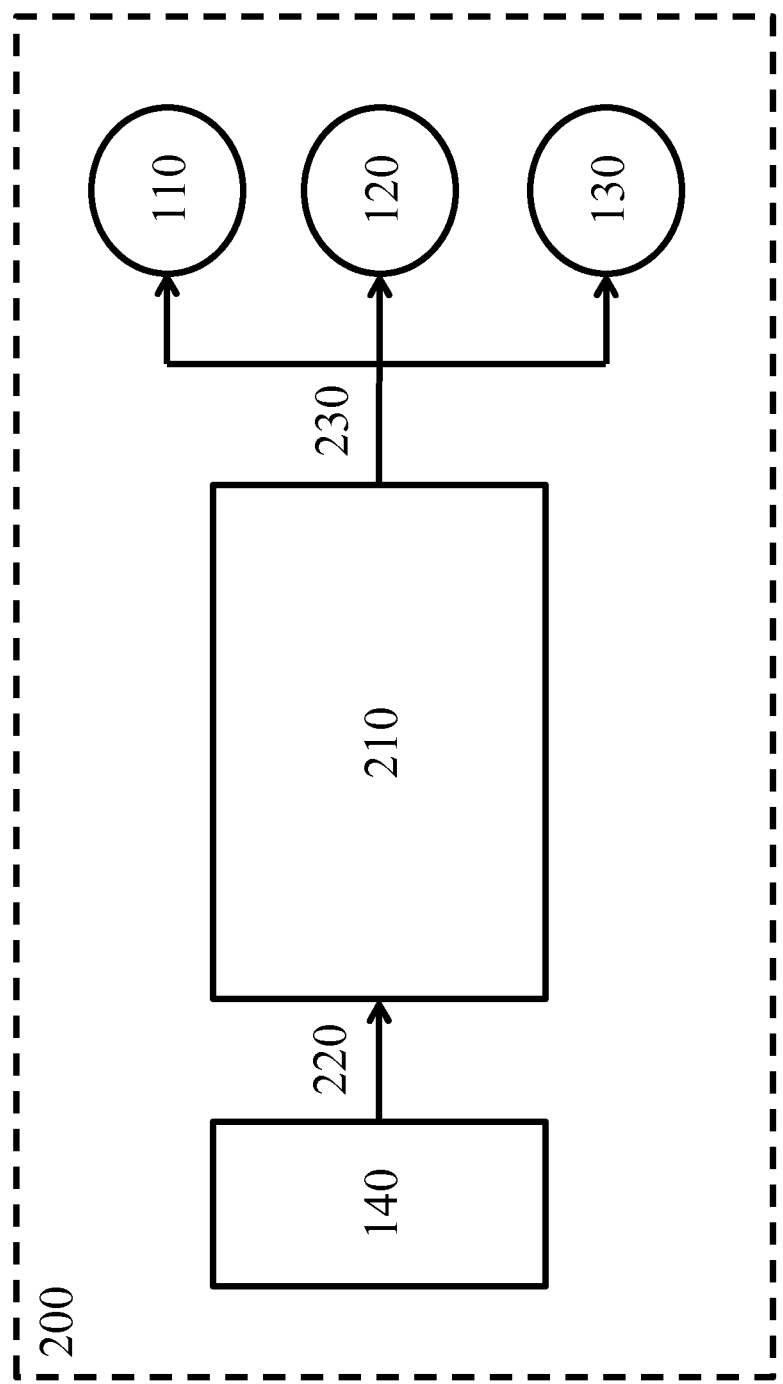
FIG. 2 shows schematically and exemplarily a lighting system controller in a lighting system.

In FIG. 2 a lighting system 200 is shown. The lighting system comprises a lighting system controller 210 having a first interface 220 to receive a trigger from a sensor 140, and a second interface 230 to control a first, second and third lighting device 110, 120, 130. The first interface 220 can, for example, be a wireless interface such as a WiFi or ZigBee interface. The second interface 230 can, for example, be a wireless interface of the same of a different type as the first interface. The first and second interface 220, 230 can be the same interface. The lighting system controller 210 and the sensor 140 can be the same physical device; i.e. the sensor 140 can be controlling the lighting devices 110, 120, 130 directly. The sensor 140 can, as another option, be part of the same physical device as one of the lighting devices 110, 120, 130. The lighting system controller 210 may control the lighting devices 110, 120, 130 directly or via a further device or interface, such as a bridge or hub.

In FIG. 3 an example of a lighting system control method 300 is shown. The exemplary method 300 comprises a first step of receiving 310 a trigger. This trigger is associated with a light output, such as a scene, of at least one of the one or more lighting devices of the lighting system. Referring to FIG. 1, the trigger may be associated with a first lighting device 110 and a second lighting device 120, but not a third lighting device 130 in a lighting system 200 comprising these three lighting devices 110, 120, 130. The light output associated with the trigger can be a default value, a user determined value, etc.

The second step of determining 320 an initial light output of each of the one or more lighting devices can be executed when the trigger is received, yet as another example the lighting system can keep track of its current output state at all times in which case the current state is already known when the trigger is received.

Generating 330 control data is the third step in the method 300. The control data is based on a predetermined absolute light setting if the initial light output is within a predetermined range. An example of such a range is the light output being zero (i.e. no visible light), the light output being controlled by a specific function such as a daylight harvesting loop, or the light output being part of a specific scene. The predetermined absolute light setting can for example specify a color and an intensity of the light to be emitted. The light setting can be a reference to a scene, such as a scene that has already been stored in the system (e.g. in individual lighting devices) for easy recall.

The control data is instead based on a predetermined function if the initial light output is outside the predetermined range. Examples of such a function are: "keep emitting light of the same color, yet increase the brightness level to the brightness level of the scene associated with the trigger", "make the mood more romantic" (e.g. add red), "make the light more functional" (e.g. closer to the black body line), "increase the ambience" (e.g. saturate colors) and "keep emitting light of the same color, yet lower the saturation to half of what it currently is". The function is thus relative to the determined initial light output, or in other words the light output according to which the lighting device(s) associated with the trigger are controlled is dependent upon the initial light output of those or other lighting device(s) in the lighting system.

Finally, the fourth step comprises controlling 340 the one or more lighting devices according to the generated control data. The control data can comprise a control command, or can be used to generate a control command, that is sent over an interface to the lighting device(s).

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. The reference to first, second, third, etc. does not indicate any order or relationship. Any reference signs in the claims should not be construed as limiting the scope.

The invention claimed is:

1. A lighting system controller for controlling a lighting device for illuminating a space, the lighting system controller comprising:
    a first interface arranged for receiving a trigger signal for changing a light output of the lighting device to a target light setting,
    a second interface arranged for controlling the lighting device according to generated control data, and
    a processor arranged for:
        determining, as an initial light output, the current light output of the lighting device, comprising the current color and the current brightness level,
        generating control data according to the target light setting, different from the initial light output, if the determined color and/or brightness level is within a predetermined color and/or intensity level range, respectively, and else
        generating control data according to a function which determines a light setting relative to the determined initial light output, wherein the function according to which control data is generated comprises: increasing the brightness of the light output of the lighting device compared to the determined initial light output, and lowering the saturation of the light output of the lighting device compared to the determined initial light output.

2. A lighting system controller according to claim 1, wherein the lighting system controller is further arranged for, after a delay, reverting the light output of the lighting device to the determined initial light output.

3. A lighting system controller according to claim 1, wherein the trigger signal is received from a presence sensor and wherein the trigger signal is indicative of the presence of a person being detected by the presence sensor.

4. A lighting system controller according to claim 1, wherein the target light setting is user defined.

5. A lighting system control method for controlling a lighting device for illuminating a space, the method comprising:
    receiving a trigger signal for changing a light output of the lighting device to a target light setting,
    determining as an initial light output the current light output of the lighting device, comprising the current color and the current brightness level,
    generating control data based on the target light setting if the determined color and/or brightness level is within a predetermined color and/or intensity level range, respectively, and else generating control data according to a function which determines a light setting relative to the determined initial light output, wherein the function according to which control data is generated comprises: increasing the brightness of the light output of the lighting device compared to the determined initial light output, and lowering the saturation of the light output of the lighting device compared to the determined initial light output, and
    controlling the lighting device according to the generated control data.

6. A lighting system control method according to claim 5, wherein the method further comprises:
    controlling, after a delay, the lighting device to revert its light output to the determined initial light output.

7. A lighting system control method according to claim 5, wherein the trigger signal is received from a presence sensor and wherein the trigger signal is indicative of the presence of a person being detected by the presence sensor.

8. A lighting system control method according to claim 5, wherein the target light setting is user defined.

9. A non-transitory computer-readable medium comprising computer program product arranged for performing, when executed on one or more processors, a method comprising the steps:
    receiving a trigger signal for changing a light output of the lighting device to a target light setting, determining as an initial light output the current light output of the lighting device, comprising the current color and the current brightness level,
generating control data based on the target light setting if the determined color and/or brightness level is within a predetermined color and/or intensity level range, respectively, and else generating control data according to a function which determines a light setting relative to the determined initial light output, wherein the function according to which control data is generated comprises: increasing the brightness of the light output of the lighting device compared to the determined initial light output, and lowering the saturation of the light output of the lighting device compared to the determined initial light output, and
controlling the lighting device according to the generated control data.

\* \* \* \* \*